US012670717B2

(12) United States Patent
Corretjer et al.

(10) Patent No.: US 12,670,717 B2
(45) Date of Patent: Jun. 30, 2026

(54) DEVICE AND METHOD FOR IDENTIFYING RELATIONSHIPS BETWEEN INDIVIDUALS IN A CROWD

(71) Applicant: MOTOROLA SOLUTIONS, INC., Chicago, IL (US)

(72) Inventors: Jesus F Corretjer, Weston, FL (US); Richard Alaburda, Sunrise, FL (US); Niyanthri Ramaswamy Naresh Prabhu, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 312 days.

(21) Appl. No.: 18/532,117

(22) Filed: Dec. 7, 2023

(65) Prior Publication Data

US 2025/0191374 A1 Jun. 12, 2025

(51) Int. Cl.
*G06V 20/52* (2022.01)
*G06V 20/40* (2022.01)
*G06V 40/20* (2022.01)

(52) U.S. Cl.
CPC .............. *G06V 20/53* (2022.01); *G06V 20/41* (2022.01); *G06V 40/20* (2022.01)

(58) Field of Classification Search
CPC ......... G06V 20/41; G06V 20/53; G06V 40/20
See application file for complete search history.

(56) References Cited

U.S. PATENT DOCUMENTS 9,292,092 B2 3/2016 Yuixin et al.
10,796,217 B2 10/2020 Wu 10,839,227 B2 11/2020 Mongeon et al.
11,282,349 B2 3/2022 Wilkosz et al.
2010/0207874 A1* 8/2010 Yuxin .................... G06Q 30/02
345/156

(Continued)

FOREIGN PATENT DOCUMENTS

CN 115761601 * 3/2023 ............. G06V 10/80
CN 116261028 * 6/2023 ............. G06V 20/17
WO 2021069053 A1 4/2021

OTHER PUBLICATIONS

Capozzi et al., "Tracking the Leader: Gaze Behavior in Group Interactions", Jun. 28, 2019 , iScience CellPress, pp. 241-257 (Year: 2019).*

(Continued)

*Primary Examiner* — Zhiyu Lu
(74) *Attorney, Agent, or Firm* — Raguraman Kumaresan

(57) ABSTRACT

A process for identifying relationships between individuals in a crowd. In operating, an electronic computing device detects questions presented to a crowd with an instruction directing the crowd to answer each question in the form of non-verbal responses rather than in the form of verbal responses. The computing device enables at least one camera to record videos capturing activities of the crowd in response to each presented question. The activities of the crowd captured in the videos are analyzed using a video analytics engine to identify a pattern of non-verbal responses that would indicate a leader-follower relationship between individuals identified from the crowd. The electronic computing device then generates a visual and/or audio output identifying the leader-follower relationship between the individuals identified from the crowd.

18 Claims, 7 Drawing Sheets

(56) References Cited

U.S. PATENT DOCUMENTS

| | | | |
|---|---|---|---|
| 2019/0272760 A1* | 9/2019 | Mcquillen | G08G 1/22 |
| 2021/0174308 A1 | 6/2021 | Olshansky | |
| 2021/0219116 A1* | 7/2021 | Perras | H04W 4/40 |
| 2022/0080260 A1 | 3/2022 | Zhang et al. | |

OTHER PUBLICATIONS

Cheng et al., "Eye gaze and visual attention as a window into leadership and followership: A review of empirical insights and future directions", Oct. 27, 2022, Elsevier, The Leadership Quarterly 34, pp. 1-19 (Year: 2022).*

\* cited by examiner

250

*400*

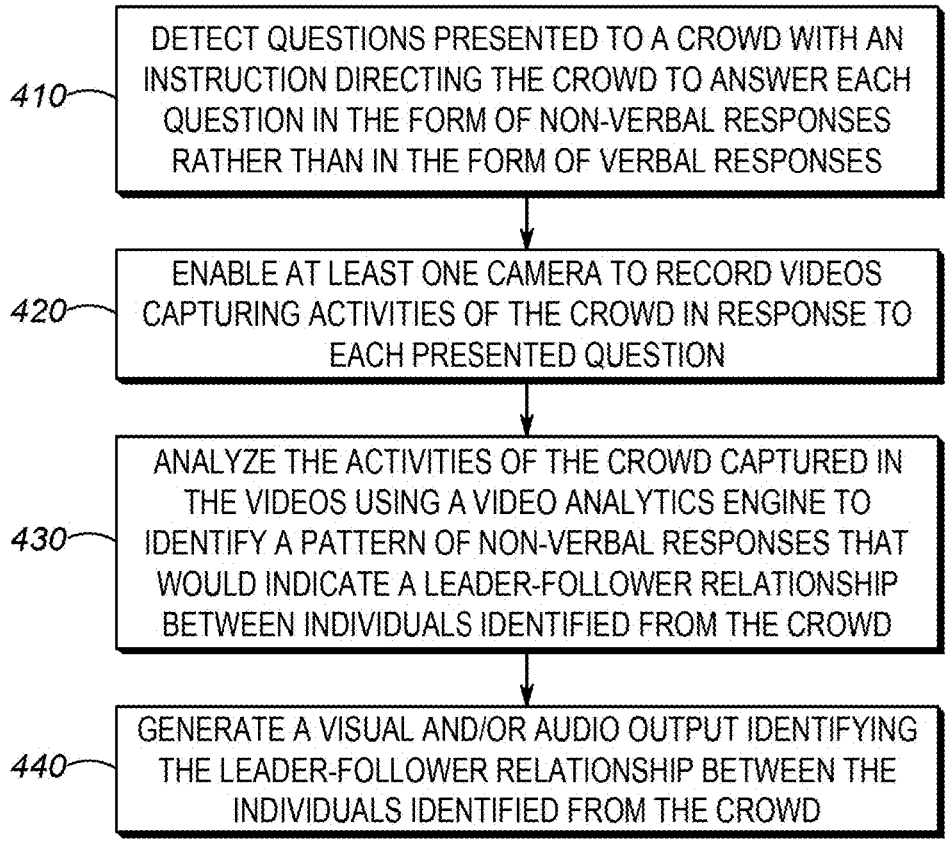

410 — DETECT QUESTIONS PRESENTED TO A CROWD WITH AN INSTRUCTION DIRECTING THE CROWD TO ANSWER EACH QUESTION IN THE FORM OF NON-VERBAL RESPONSES RATHER THAN IN THE FORM OF VERBAL RESPONSES

420 — ENABLE AT LEAST ONE CAMERA TO RECORD VIDEOS CAPTURING ACTIVITIES OF THE CROWD IN RESPONSE TO EACH PRESENTED QUESTION

430 — ANALYZE THE ACTIVITIES OF THE CROWD CAPTURED IN THE VIDEOS USING A VIDEO ANALYTICS ENGINE TO IDENTIFY A PATTERN OF NON-VERBAL RESPONSES THAT WOULD INDICATE A LEADER-FOLLOWER RELATIONSHIP BETWEEN INDIVIDUALS IDENTIFIED FROM THE CROWD

440 — GENERATE A VISUAL AND/OR AUDIO OUTPUT IDENTIFYING THE LEADER-FOLLOWER RELATIONSHIP BETWEEN THE INDIVIDUALS IDENTIFIED FROM THE CROWD

*FIG. 4*

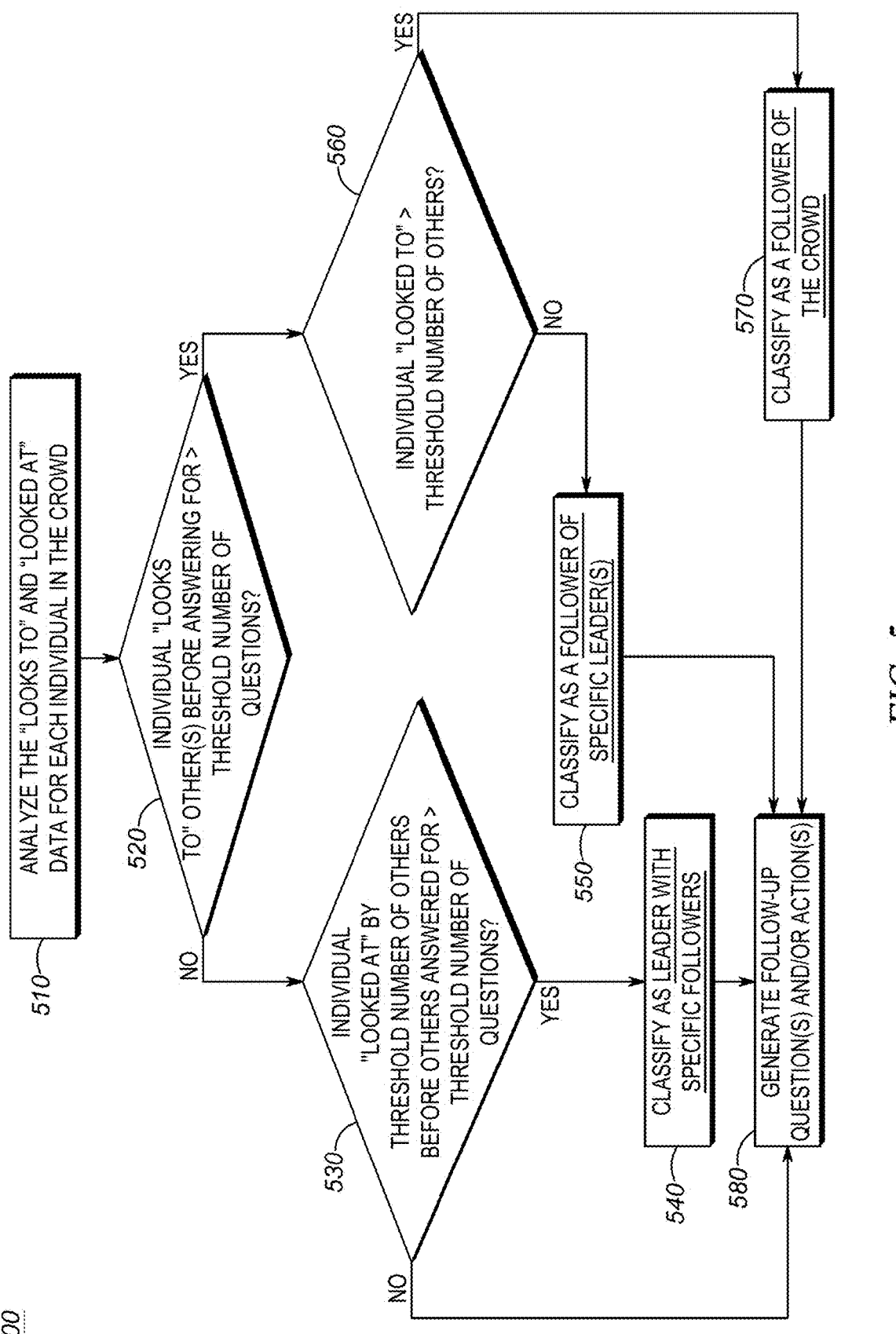

510 — ANALYZE THE "LOOKS TO" AND "LOOKED AT" DATA FOR EACH INDIVIDUAL IN THE CROWD

520 — INDIVIDUAL "LOOKS TO" OTHER(S) BEFORE ANSWERING FOR > THRESHOLD NUMBER OF QUESTIONS?

560 — INDIVIDUAL "LOOKED TO" > THRESHOLD NUMBER OF OTHERS?

530 — INDIVIDUAL "LOOKED AT" BY THRESHOLD NUMBER OF OTHERS BEFORE OTHERS ANSWERED FOR > THRESHOLD NUMBER OF QUESTIONS?

550 — CLASSIFY AS A FOLLOWER OF SPECIFIC LEADER(S)

570 — CLASSIFY AS A FOLLOWER OF THE CROWD

540 — CLASSIFY AS LEADER WITH SPECIFIC FOLLOWERS

580 — GENERATE FOLLOW-UP QUESTION(S) AND/OR ACTION(S)

DEVICE AND METHOD FOR IDENTIFYING RELATIONSHIPS BETWEEN INDIVIDUALS IN A CROWD

BACKGROUND

Government and private agencies often need to monitor and process crowds of people. For example, government agencies responsible for customs and border protection may need to interview or screen a large number of immigrants at the borders on a daily basis. In many cases, an individual in the crowd may be leading other individuals in the crowd or may be influencing responses made by other individuals in the crowd during an interview or screening process. Similarly, individuals in the crowd may be following other individuals in the crowd or may be copying answers provided by other individuals during an interview. The process of manually interviewing crowds of people to identify relationships between individuals in the crowd based on their responses is however very tedious and time consuming.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 illustrates a flowchart of a process for identifying relationships between individuals in a crowd in accordance with some embodiments.

FIG. 5 illustrates a flowchart of a process of classifying individuals in a crowd in accordance with some embodiments.

Figure 1:
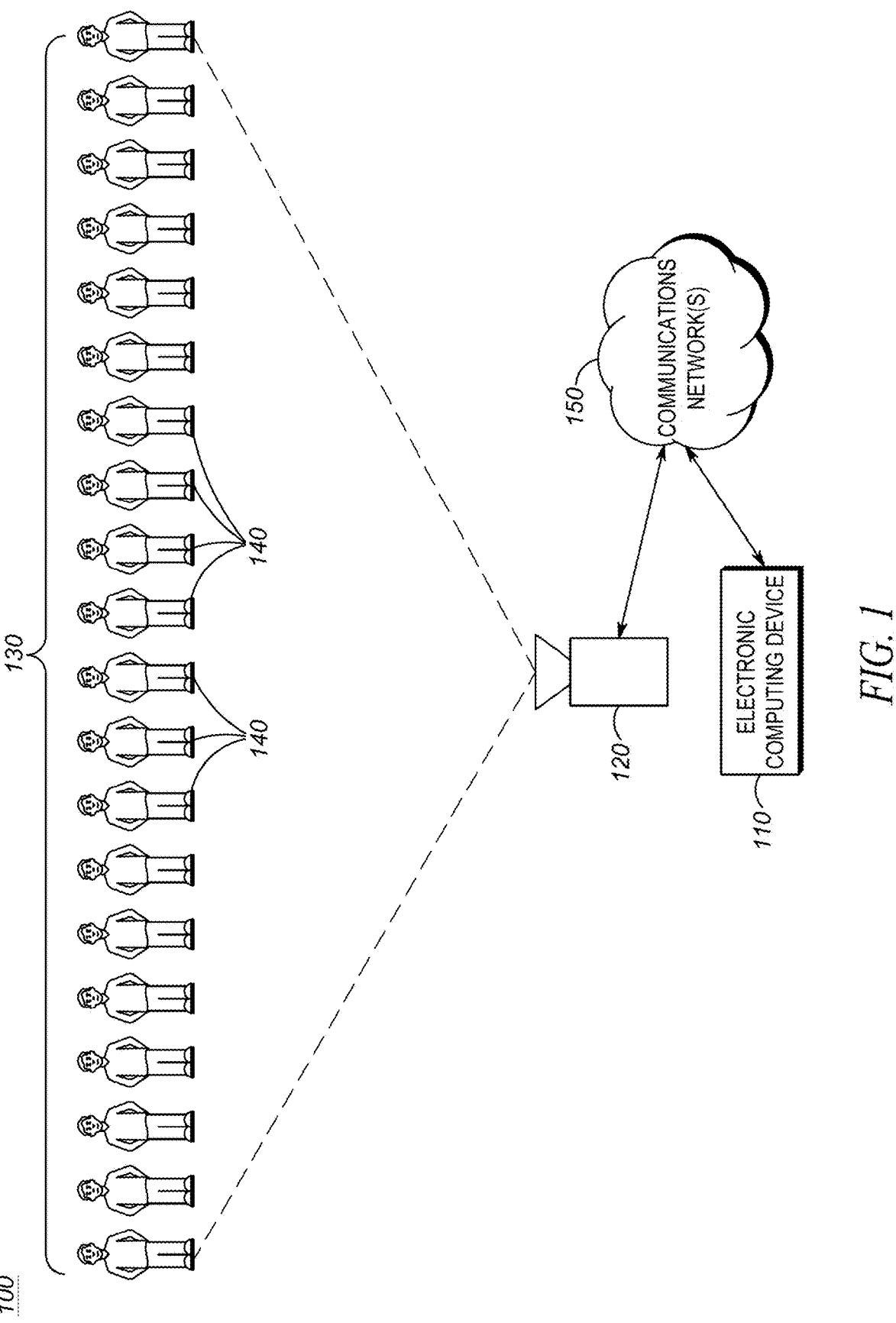
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, manually interviewing crowds of people is tedious and time consuming. In some situations, when there is a need to screen crowds of people, it may be convenient and efficient to interview crowds of people simultaneously i.e., as a group interview instead of interviewing or screening each individual from the crowd separately. During such a group interviewing process, there is an opportunity to identify people who may be working together based on a pattern of non-verbal responses received from different individuals in the crowd. For example, some individuals in the crowd may look to other individuals in the crowd before answering a question presented to the crowd. Such individuals may be referred to as "followers" based on their tendency to look to other individuals for responding to a majority of questions presented to them. Similarly, certain individuals in the crowd may be looked at by other individuals in response to a question posed during the group interview. Such individuals may be referred to as "leaders" based on many individuals looking to them for responding to a majority of questions presented to them. Analyzing a pattern of non-verbal responses such as looking at another individual in the crowd before responding to a number of questions during a group interview or being looked at by a number of other individuals in the crowd can be helpful in decoding the relationships between the individuals in the crowd. Therefore, there is a need for a technological solution to analyze non-verbal responses made by individuals in a crowd to automatically identify relationships between individuals in a crowd.

One embodiment provides a method of identifying relationships between individuals in a crowd. The method includes: detecting, at the electronic computing device, questions presented to a crowd with an instruction directing the crowd to answer each question in the form of non-verbal responses rather than in the form of verbal responses; enabling, at the electronic computing device, at least one camera to record videos capturing activities of the crowd in response to each presented question; analyzing, at the electronic computing device, the activities of the crowd captured in the videos using a video analytics engine to identify a pattern of non-verbal responses that would indicate a leader-follower relationship between individuals identified from the crowd; and generating, at the electronic computing device, a visual and/or audio output identifying the leader-follower relationship between the individuals identified from the crowd.

Another embodiment provides an electronic computing device, comprising: a communications unit; and an electronic processor communicatively coupled to the communications unit. The electronic processor is configured to: detect questions presented to a crowd with an instruction directing the crowd to answer each question in the form of non-verbal responses rather than in the form of verbal responses; enable, via the communications interface, at least one camera to record videos capturing activities of the crowd in response to each presented question; receive, via the communications interface, the recorded videos capturing activities of the crowd; analyze the activities of the crowd captured in the videos using a video analytics engine to identify a pattern of non-verbal responses that would indicate a leader-follower relationship between individuals identified from the crowd; and generate a visual and/or audio output via a corresponding visual and/or audio output identifying the leader-follower relationship between the individuals identified from the crowd.

In the above embodiments, the electronic computing device determines that the pattern of non-verbal responses would indicate the leader-follower relationship when analysis of the activities of the crowd indicate that (i) at least one individual from the crowd looked to at least one other individual from the crowd before responding to greater than a threshold number of the questions presented to the crowd, and (ii) the at least one individual looked to not greater than a threshold number of other individuals from the crowd before responding to the questions presented to the crowd, and classifies the at least one individual as a follower in the leader-follower relationship. The visual and/or audio output further indicates that the at least one individual is classified as the follower in the leader-follower relationship.

In the above embodiments, the electronic computing device determines that the pattern of non-verbal responses would indicate the leader-follower relationship when analysis of the activities of the crowd indicate that (i) at least one individual from the crowd was looked at by greater than a threshold number of other individuals in the crowd before responding to greater than a threshold number of the questions presented to the crowd, and (ii) the at least one individual did not look to other individuals from the crowd before responding to greater than the threshold number of the questions presented to the crowd, and classifies the at least one individual as a leader in the leader-follower relationship. The visual and/or audio output further indicates that the at least one individual is classified as the leader in the leader-follower relationship.

In the above embodiments, the electronic computing device analyzes the activities of the crowd captured in the videos using the video analytics engine to identify a second pattern of non-verbal responses indicating that (i) at least one individual from the crowd looked to at least one other individual from the crowd before responding to greater than a threshold number of the questions presented to the crowd, and (ii) the at least one individual looked to greater than a threshold number of other individuals from the crowd before responding to the questions presented to the crowd, and classifies the at least one individual as a follower of the crowd. The visual and/or audio output further indicates that the at least one individual is classified as the follower of the crowd.

In the above embodiments, the electronic computing device categorizes one or more of the non-verbal responses captured in response to each question presented to the crowd as a physical gesture made by a respective one of the individuals from the crowd to answer to a respective one of the questions presented to the crowd.

In the above embodiments, the electronic computing device interprets the meaning of the physical gesture to generate a verbal answer corresponding to the physical gesture for each of the one or more non-verbal responses categorized as the physical gesture. The visual and/or audio output further provides an indication of the verbal answer interpreted from the physical gesture made by a respective one of the individuals to respond to the respective one of the questions presented to the crowd.

In the above embodiments, the electronic computing device generates a follow-up question to be presented to the respective one of the individuals or a follow-up action to be performed with respect to the respective one of the individuals as a function of the verbal answer generated corresponding to the physical gesture and the respective one of the individual's role either as a leader or a follower in the leader-follower relationship.

In the above embodiments, the electronic computing device analyzes the activities of the crowd captured in the videos using a video analytics engine to identify a pattern of lack of responses from at least one individual from the crowd for greater than a threshold number of questions presented to the crowd and generates a follow-up question to be presented privately to the at least one individual or a follow-up action to be performed with respect to the at least one individual. The visual and/or audio output further indicates a follow-up question or the follow-up action.

In the above embodiments, the electronic computing device provides, via the visual and/or audio output, an instruction to arrange at least one camera to have a field of view covering each individual from the crowd.

In the above embodiments, the visual and/or audio output further includes an identity for each of the individuals identified from the crowd and an indication of whether each of the individuals identified from the crowd is classified as a leader or a follower in the leader-follower relationship.

Each of the above-mentioned embodiments will be discussed in more detail below, starting with example system and device architectures of the system in which the embodiments may be practiced, followed by an illustration of processing blocks for achieving an improved technical method of identifying relationships between individuals in a crowd. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 and one or more cameras 120. The electronic computing device 110 is a server or client computing device configured to communicate with the one or more cameras 120 to acquire videos (or images) recorded corresponding to activities of a crowd 130 and analyze the videos to identify relationships between individuals 140 in the crowd 130. The crowd 130 represents any number of individuals 140 who have assembled or gathered together at a given location. In accordance with some embodiments, the crowd 130 includes a group of individuals 140 identified by a public-safety agency as being associated with an unlawful activity and further assembled in a given location (e.g., an interview room) for further interviewing or screening purposes. As an example, the crowd 130 shown in FIG. 1 may represent a group of individuals 140 who have been detained or apprehended by a public agency (e.g., customs and state border protection agency) for suspected illegal crossing and are further awaiting the interrogation or questioning process. As another example, the crowd 130 shown in FIG. 1 may represent a group of individuals 140 suspected to be members of a gang involved in criminal activities and have been assembled for the purpose of undergoing questioning by law enforcement officers. The crowd 130 in the above example may include an individual or a gang member who may usually wait for a leader present in the group to answer first before he or she can provide answers that are consistent with the leader. Similarly, the crowd 130 in the above example can also include individuals who are not involved in criminal activities (e.g., victims in a human trafficking incident) but rather are coerced or compelled to provide false statements or statements that are consistent with their oppressor (e.g., gang leader) who are also present in the crowd 130. In accordance with some embodiments, the individuals 140 included in the crowd 130 are particularly selected and assembled by an agency to perform a group interview and to identify the relationships between individuals 140 in the crowd 130. An agency is an organizational entity that is responsible for interviewing and processing crowds of people who may be involved in or otherwise affected by unlawful activities. In some embodiments, an agency may represent a public organization such as a public-safety agency (e.g., police, fire, emergency medical service, customs and border protection). In other embodiments, an agency may represent a private enterprise organization such as press, media, utilities, retail, healthcare, manufacturing, oil/gas, electric, private security, or other business.

Group interviewing process can take many forms. An example group interviewing process includes presenting questions simultaneously to all the individuals 140 in the crowd 130 and instructing the crowd 130 to provide their responses as a non-verbal response (i.e., non-speech response) instead of as a verbal or speech response. As used herein, the term "group interview" refers to an interview process conducted by or on behalf of an agency, where the interview process includes presenting questions to a crowd 130 with an instruction particularly directing the crowd 130 to answer each question in the form of non-verbal responses rather than in the form of verbal responses. In accordance with embodiments, the electronic computing device 110 is configured to automatically detect patterns of non-verbal responses made by individuals 140 in the crowd 130 during the group interview and identify relationships (e.g., leader-follower relationships) between individuals 140 in the crowd 130. The pattern of non-verbal responses is also further helpful to classify an individual 140 as a "follower" or a "leader" of a particular group within the crowd 130.

The one or more cameras 120 may be fixed or movable, and include, but are not limited to, surveillance cameras, vehicle cameras, body-worn cameras, mobile device cameras, and drone cameras that may be controlled by public or private agencies to record videos capturing activities of the crowd 130. The videos captured by the camera 120 may be stored in one or more databases (not shown) that are accessible by the electronic computing device 110 via one or more communication networks 150. The databases may be implemented using any type of storage device, storage server, storage area network, redundant array of independent discs, cloud storage device, or any type of local or network-accessible data storage device configured to store data records for access by the electronic computing device 110. In some embodiments, the one or databases may be housed on suitable on-premise database servers or edge computing devices that may be owned and/or operated by public-safety or private agencies. The communication network 150 may include wireless and/or wired connections. For example, the communication network 150 may be implemented using a wide area network, such as the Internet, a local area network, such as a Wi-Fi network, and personal area or near-field networks, for example a Bluetooth™ network. Portions of the communications network may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

In accordance with embodiments, the one or more cameras 120 are spatially arranged relative to a position of the crowd 130 such that each individual 140 in the crowd 130 is covered by the field of view of at least one of the cameras 120. In one embodiment, the electronic computing device 110 determines a proper spatial arrangement of the cameras 120 relative to the position of the crowd 130 based on factors such as the size and density of the crowd 130, distance between the camera(s) 120 and the crowd 130, relative positions of the individuals 140 within the crowd 130, and capabilities or characteristics of the camera(s) 120 including whether the camera(s) 120 are fixed or portable, whether the camera(s) 120 can be panned, tilted, or zoomed, or whether the camera 120 is a 360 degree camera that can be controlled to record in every direction at the same time. As used herein, the term "proper spatial arrangement" indicates that the cameras 120 and the crowd 130 are arranged to ensure that each individual 140 is covered by the field of view of at least one of the cameras 120. In one embodiment, the electronic computing device 110 may generate recommendations for camera placement and/or crowd formation to achieve a proper spatial arrangement of the cameras 120 relative to the position of the crowd 130. The electronic computing device 110 may also provide a visual and/or audio output (e.g., via a display or a speaker) of the recommendations to enable an agency initiating the group interview to manually change the placement of the cameras 120 and/or to instruct the crowd 130 to change their formation and/or to reposition certain individuals 140 within the crowd 130. In accordance with some embodiments, the electronic computing device 110 automatically adjusts the characteristics (e.g., pan, tilt, zoom, or movement) of the one or more cameras 120 for proper spatial arrangement of the cameras 120 relative to the position of the crowd 130. In one example, as shown in FIG. 1, the individuals 140 in the crowd 130 are instructed to line up side-by-side to enable a camera 120 to monitor and record the activities of each individual 140 in the crowd 130 during a group interview.

Figure 2A:
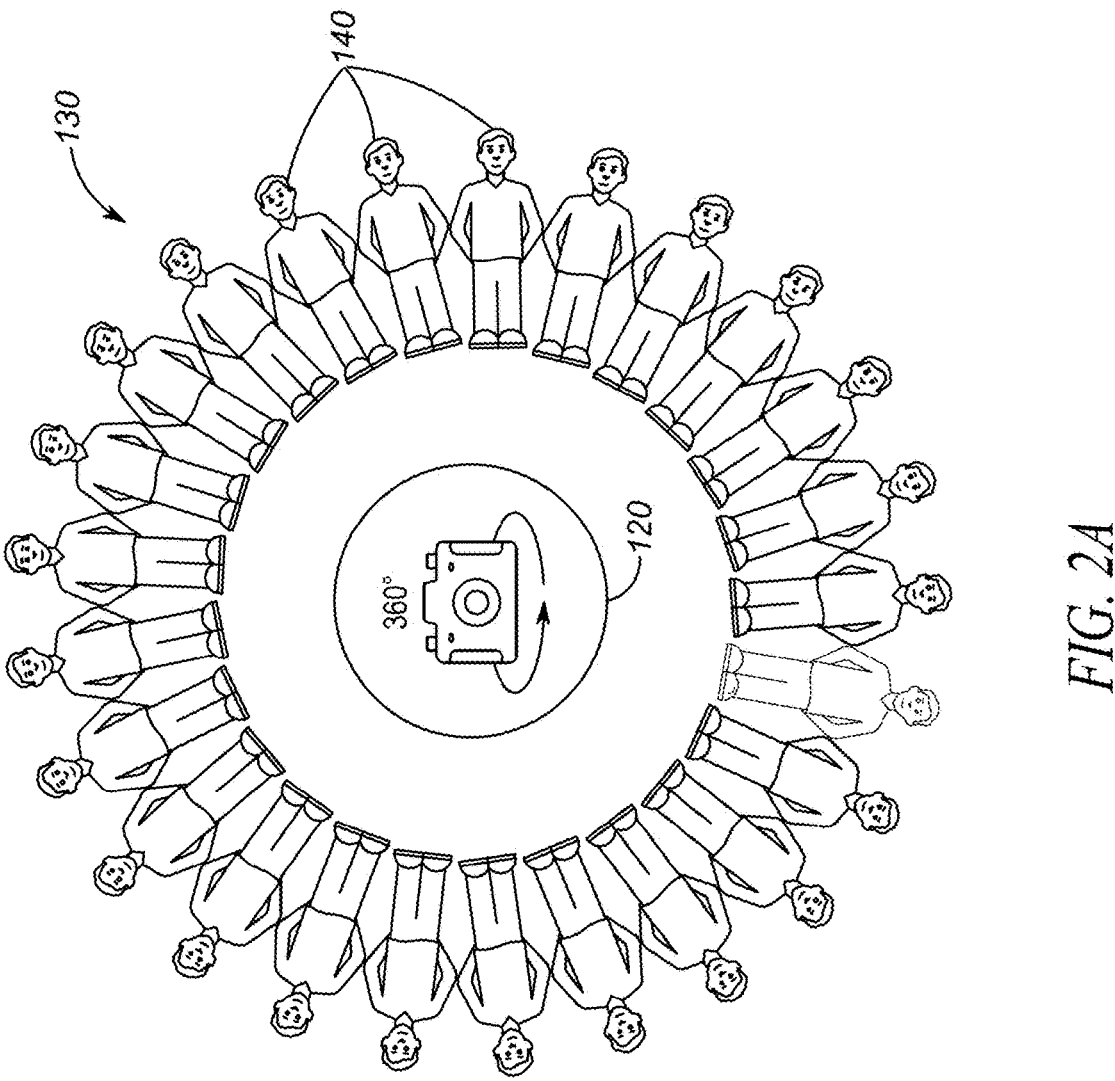
FIGS. 2A and 2B illustrate examples of spatial arrangements of camera(s) relative to a crowd position.
Figure 2B:
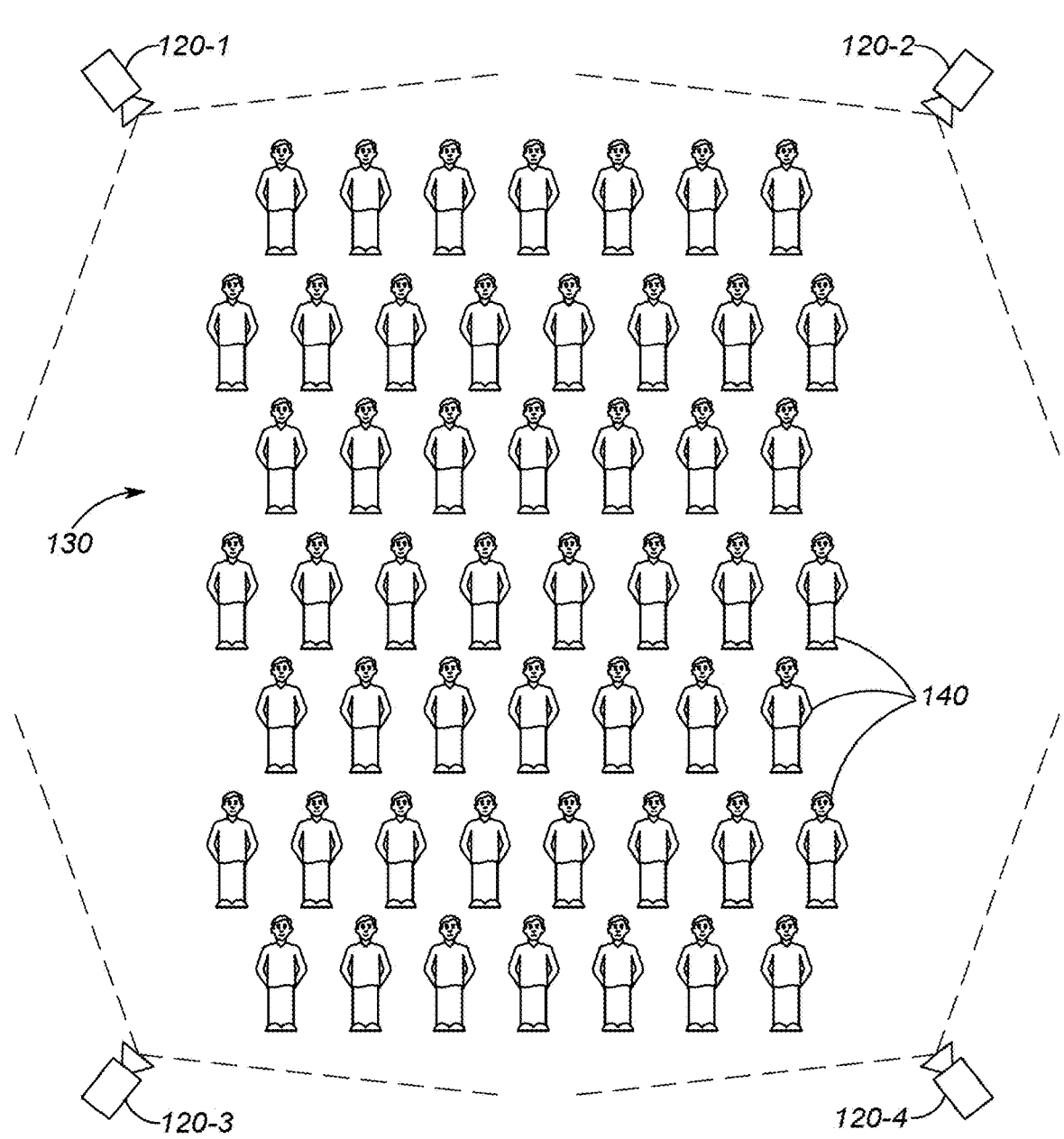
Figure 3:
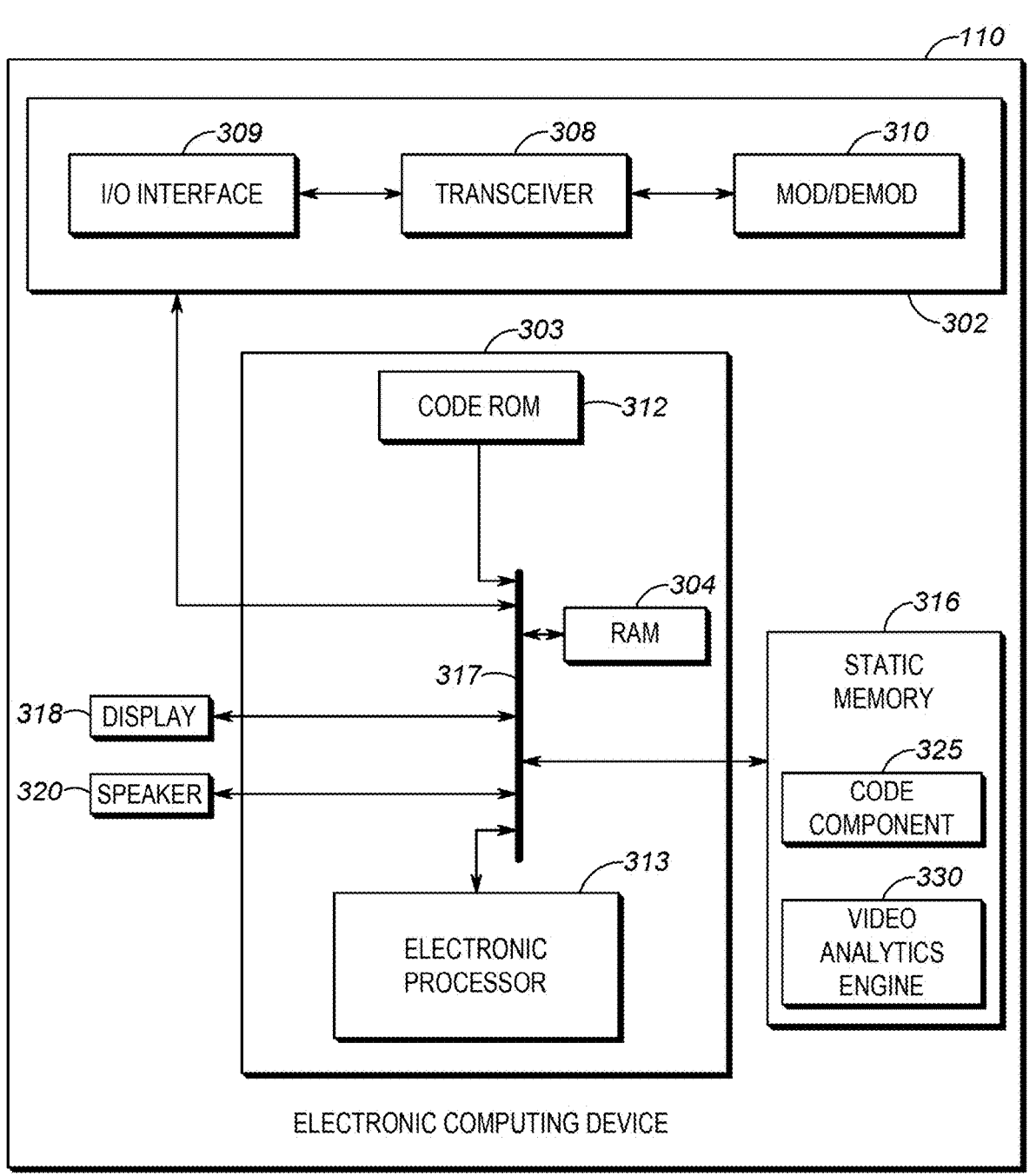
FIG. 3 is a block diagram of an electronic computing device shown in FIG. 1 in accordance with some embodiments.

FIGS. 2A and 2B show additional examples of spatial arrangements of the cameras 120 relative to the position of the crowd 130. In an example 200 shown in FIG. 2A, the individuals 140 in the crowd 130 are instructed to line up in a circular formation to allow a 360 degree camera 120 to simultaneously capture activities of the crowd 130 from any direction. FIG. 2B provides an example 250 of how multiple cameras 120-1, 120-2, 120-3, 120-4 can be spatially arranged relative to the position of the crowd 130 to enable at least one of the multiple cameras 120-1, 120-2, 120-3, 120-4 to monitor and record activities of at least one of the individuals 140 in the crowd 130 during a group interview. The spatial arrangements shown in FIGS. 1, 2, and 3 are for illustrative purposes only. Other spatial arrangements different from the above examples can also be used as long as a proper spatial arrangement can be achieved to ensure each individual 140 from the crowd 130 can be captured within a field of view of at least one of the cameras 120. In any case, when proper spatial arrangement is achieved, as either determined based on input from officers associated with an agency or as automatically determined based on analysis of sample videos captured corresponding to the crowd 130, the electronic computing device 110 executes the processes described herein with reference to FIGS. 4 and 5 to identify relationships between individuals 140 in the crowd 130 and to classify individuals 140 identified from the crowd 130 based on a pattern of non-verbal responses detected in response to questions presented to the crowd 130.

FIG. 3 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 can be implemented within the camera 120. While FIG. 3 represents an electronic computing device 110 described above with respect to FIG. 1, the electronic computing device 110 may include fewer or additional components in configurations different from that illustrated in FIG. 3.

As shown in FIG. 3, the electronic computing device 110 includes a communications unit 302 (also referred to as a "communications interface") coupled to a common data and address bus 317 of a processing unit 303. The communications unit 302 sends and receives data to and from other devices in the system 100. The communications unit 302 may include one or more wired and/or wireless input/output (I/O) interfaces 309 that are configurable to communicate with other devices (e.g., camera(s) 120) in the system 100. For example, the communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The processing unit 303 may include an encoder/decoder with a code Read Only Memory (ROM) 312 coupled to the common data and address bus 317 for storing data for initializing system components. The processing unit 303 may further include an electronic processor 313 (for example, a microprocessor, a logic circuit, an application-specific integrated circuit, a field-programmable gate array, or another electronic device) coupled, by the common data and address bus 317, to a Random Access Memory (RAM) 304 and a static memory 316. The electronic processor 313 may generate electrical signals and may communicate signals through the communications unit 302.

Static memory 316 may store operating code 325 for the electronic processor 313 that, when executed, performs one or more of the blocks set forth in FIGS. 4 and 5, and the accompanying text(s). The static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 316 may temporarily or permanently store videos received from the camera 120 for the purposes of identifying relationships between individuals 140 in a crowd 130 and classifying individuals identified 140 from the crowd 130. The static memory 316 may also store information about individuals 140 identified from the crowd 130. The information, for example, includes name, number, or other data particularly identifying the individual (e.g., an image capturing an individual's face), non-verbal responses (or lack of responses) including any physical gestures made by the individual 140 in response to questions presented to the crowd 130, and classification of the individual 140 as a leader with specific follower(s), as a follower of a specific leader(s), or as follower of the crowd 130. The static memory 316 may also include information about the spatial arrangement of the camera(s) 120 relative to the position of the crowd 130, the number of cameras 120, and a count of individuals 140 present in the crowd 130. In one embodiment, the electronic computing device 110 may use information about historically used spatial arrangements of cameras 120 and crowds 130 to generate recommendations for placement of cameras 120 and/or crowd formation for a current group interview. The static memory 316 may additionally store follow-up questions to be presented to one or more individuals 140 in the crowd 130 and/or follow-up actions to be performed by an agency after the completion of the group interview.

The static memory 316 further stores operating code associated with a video analytics engine 330 for analyzing the activities of the crowd 130 captured in the videos recorded by the camera 120. In these embodiments, the video analytics engine 330 may include one or more classifiers that may be particularly trained to interpret a meaning of a non-verbal response including a physical gesture made by an individual 140 in response to a question presented to the crowd 130. The video analytics engine 330 may additionally include a gesture recognition engine that is configured to recognize different physical gestures made by individuals 140 in the crowd 130 during a group interview.

The electronic computing device 110 further includes or otherwise is communicatively coupled to an electronic display 318 that is provided for generating a visual output for displaying images, video, and/or text corresponding to one or more of (i) questions and/or instructions (e.g., instructions directing the crowd 130 to answer each question in the form of non-verbal responses or instructions directing the crowd 130 to reset to their default body position before presenting a next question to the crowd 130) that may be presented to the crowd 130 during a group interview, (ii) identification of leader-follower relationship between the individuals 140 identified from the crowd 130 including how different individuals 140 from the crowd 130 are classified into one of a leader with a specific follower or followers, a follower of a specific leader or leaders, or a follower of the crowd (i.e., not following a specific individual), or (iii) a follow-up question to be presented to or a follow-up action to be performed with respect to one or more individuals 140 identified from the crowd 130 after the completion of the group interview. The electronic display 318, for example, includes a liquid crystal display (LCD) screen or an organic light emitting (OLED) display screen. In some embodiments, the display 318 includes a touch sensitive input interface to allow a user (e.g., an officer associated with an agency performing the group interview) operating the electronic computing device 110 to interact with the content rendered on the display 318.

The electronic computing device 110 may further include an audio-output component such as a speaker 320. The speaker 320 may produce an audio output corresponding to one or more of one or more of (i) questions and/or instructions (e.g., instructions directing the crowd 130 to answer each question in the form of non-verbal responses or instructions directing the crowd 130 to reset to their default body position before presenting a next question to the crowd 130) that may be presented to the crowd 130 during a group interview, (ii) identification of leader-follower relationship between the individuals 140 identified from the crowd 130 including how different individuals 140 from the crowd 130 are classified into one of a leader with a specific follower or followers, a follower of a specific leader or leaders, or a follower of the crowd (i.e., not following a specific individual), or (iii) a follow-up question to be presented to or a follow-up action to be performed with respect to one or more individuals 140 identified from the crowd 130 after the completion of the group interview.

Turning now to FIG. 4, a flowchart diagram illustrates a process 400 for identifying relationships between individuals 140 in a crowd 130. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 3, and embodied as a singular computing device or distributed computing device may execute process 400 via an electronic processor 313.

The electronic computing device 110 may execute the process 400 at power-on, at some predetermined periodic time period thereafter, in response to a trigger raised locally at the electronic computing device 110 via an internal process or via an input interface or in response to a trigger from an external device (e.g., a computing device associated with an agency initiating a group interview with the crowd 130) to which the electronic computing device 110 is communicably coupled, among other possibilities. As an example, the electronic computing device 110 is programmed to automatically trigger execution of the process 400 in response to receiving an input (e.g., from an officer associated with the agency) indicating that a proper spatial arrangement of the cameras 120 relative to the position of the crowd 130 is achieved for initiating a group interview.

The process 400 of FIG. 4 need not be performed in the exact sequence as shown and likewise various blocks may be performed in different order or alternatively in parallel rather than in sequence. The process 400 may be implemented on variations of the system 100 of FIG. 1 as well.

At block 410, the electronic computing device 110 detects questions presented to a crowd 130 with an instruction directing the crowd 130 to answer each question in the form of non-verbal responses rather than in the form of verbal responses. As described previously, a number of questions may be presented to the crowd 130 during a group interview initiated by an agency for identifying relationships between individuals 140 in the crowd 130. In one embodiment, the questions to be presented to the crowd 130 during the group interview are pre-determined and one or more officers associated with the agency may present the questions to the crowd 130 orally. Additionally, or alternatively, the questions may also be rendered and presented via a display 318 or a speaker 320 shown in FIG. 3. Similarly, the instruction to the crowd 130 to answer in the form of non-verbal responses may be manually presented by one or more officers orally or as a visual and/or audio output via the display 318 and/or speaker 320. Furthermore, in this embodiment, the electronic computing device 110 may employ one or more analytics engines (e.g., speech to text engine, video analytics engine, natural language processing engine etc.,) to automatically detect that the crowd 130 is being presented with questions with an instruction directing the crowd 130 to answer each question in the form of non-verbal responses rather than in the form of verbal responses. As an example, the electronic computing device 110 may use a speech-to-text engine in combination with a natural language processing engine and/or machine learning algorithms to automatically detect whether a speech input detected from one or more officers associated with the agency includes questions presented to a crowd 130 during a group interview. The electronic computing device 110 may also similarly detect whether the speech input detected from the one or more officers contains an instruction directing the crowd 130 to answer the questions in the form of non-verbal responses rather than in the form of verbal responses.

In accordance with some embodiments, the electronic computing device 110 presents questions to the crowd 130 with limited or no human input. In these embodiments, the electronic computing device 110 may be provisioned with a list of questions (e.g., as text, audio, or video question) to be presented to the crowd 130. The electronic computing device 110 may automatically select and playback a set of selected questions, for example, via the display 318 and/or speaker 320 shown in FIG. 3. The electronic computing device 110 may playback one selected question at a time and may wait for a predetermined time to enable the crowd 130 to provide their non-verbal responses (and to reset to their default body position) before playing back a next selected question from the list. In embodiments where the questions are provisioned in the form of text, the electronic computing device 110 converts the text to speech form before playing back the questions in visual and/or audio form via the display 318 and/or speaker 320 shown in FIG. 3.

The questions presented to the crowd 130 are structured to enable the crowd 130 to answer the questions in the form of non-verbal responses or gestures. In accordance with some embodiments, the electronic computing device 110 generates questions to be presented to the crowd 130 without any human input. In these embodiments, the electronic computing device 110 automatically structures the questions presented to the crowd 130 based on information such as a type of the agency initiating the group interviewing process with the crowd 130 and the type of unlawful activities or incidents that one or more of the individuals 140 in the crowd 130 were suspected or detected to have been involved in as perpetrators or victims. For example, the electronic computing device 110 may structure a question as "Raise your hand if you are from [a particular country]." In response, each individual 140 in the crowd 130 may provide a non-verbal response by raising their hand or by not raising their hand. As another example, the electronic computing device 110 may structure a question as "Are you traveling alone?" In response, individuals 140 in the crowd 130 may nod their head vertically to indicate that they are traveling alone or alternatively nod their head horizontally to indicate that they are not traveling alone. The electronic computing device 110 may also similarly generate an instruction (to direct the crowd 130 to answer each question in the form of non-verbal responses rather than in the form of verbal responses) without any human input. The questions and instructions generated by the electronic computing device 110 may be automatically played back via the display 318 and/or the speaker 320 shown in FIG. 3. In some embodiments, the questions and instructions generated by the electronic computing device 110 are only recommendations and an officer associated with the agency can add, modify, remove, or otherwise approve the questions and instructions recommended by the electronic computing device 110 before the questions and instructions are presented to the crowd 130 during the group interview.

At block 420, the electronic computing device 110 enables at least one camera 120 to record videos capturing activities of the crowd 130 in response to each presented question. In one embodiment, the electronic computing device 110 sends an activation signal (e.g., via the communications interface 302 shown in FIG. 3) to the camera 120 to begin recording the activities of the crowd 130 immediately in response to detecting a first question and/or instruction presented to the crowd 130. In other embodiments, the electronic computing device 110 may activate the camera 120 to begin recording the activities of the crowd 130 as soon as it detects (or receives an input from an officer associated with the agency) that a crowd 130 is assembled for the group interview. In one embodiment, the camera 120 remains enabled or activated to record the activities of the crowd 130 until the electronic computing device 110 detects (or receives an input from an officer associated with the agency) that the group interviewing process is completed. For example, the electronic computing device 110 sends a deactivation signal (e.g., via the communications interface 302 shown in FIG. 3) to the camera 120 to stop recording the activities of the crowd 130 in response to detecting that all the questions included in a selected list of questions were presented to the crowd 130 and further the activities of the crowd 130 in response to a final question presented to the crowd 130 were recorded. In another embodiment, the electronic computing device 110 instructs the camera 120 to record the activities of the crowd 130 only for a predetermined period of time (or until a deactivation signal is received from the electronic computing device 110) after a question has been presented to the crowd 130. In this embodiment, the electronic computing device 110 may send an activation signal to the camera 120 to begin recording the activities of the crowd 130 each time the electronic computing device 110 detects a question presented to the crowd 130.

At block 430, the electronic computing device 110 analyzes the activities of the crowd 130 captured in the videos using a video analytics engine 330 shown in FIG. 3 to identify a pattern of non-verbal responses that would indicate a leader-follower relationship between individuals 140 identified from the crowd 130. The video analytics engine 330 may include one or more classifiers or recognition engines that may be particularly trained to recognize or interpret a meaning of a non-verbal response made by an individual 140 in response to a question presented to the crowd 130. For instance, a non-verbal response made by an individual 140 may include a change in direction or orientation of one or more body parts of the individual 140. An individual's 140 non-verbal response(s) may include a physical gesture actively made by an individual 140 with an intent to answer a question presented to the crowd 130. Additionally or alternatively, an individual's 140 non-verbal response(s) may also include physical gestures, face expressions, or postures that the individual 140 made not with an intent to answer a question presented to the crowd 130. For example, an individual 140 may make certain non-verbal responses when the individual 140 is hesitant, unsure, or intends to wait for other individuals to respond or to copy a response made by another individual before providing his or her own non-verbal answer to the question. For instance, an individual 140 may look to another individual before providing his own non-verbal response to the presented question. In accordance with embodiments, the video analytics engine 330 is trained to process the videos capturing activities of each individual 140 in the crowd 130 in response to each presented questions and categorize each non-verbal response detected from an individual into one of (i) a physical gesture (e.g., raising hand, pointing fingers, moving the head vertically or horizontally etc.,) actively made by an individual 140 with an intent to answer a question presented to the crowd 130, or (ii) a physical gesture (e.g., changing eye gaze direction or moving the head or body to look toward another individual in response to a question presented to the crowd 130) made by an individual 140 not with an intent to answer the question presented to the crowd 130 but to look to other individuals to possibly copy their answers. Additionally, if the video analytics engine 330 cannot recognize a category of non-verbal response made by an individual 140 or if the video analytics engine 330 detects that the individual 140 has not made any non-verbal response in response to a question presented to the crowd 130, the video analytics engine 330 may categorize such responses as a lack of response from the individual 140 to a question presented to the crowd 130. In one embodiment, when one or more individuals 140 in the crowd 130 do not provide any non-verbal responses within a predetermined time after a question was presented to the crowd 130, the electronic computing device 110 may call out (e.g., by individual's name or position within the crowd 130) the non-responding individuals to provide a non-verbal response within an additional specified period before proceeding with presenting a next question to the crowd 130.

In accordance with embodiments, for each non-verbal response that has been categorized as a physical gesture made by an individual 140 with an intent to answer the question presented to the crowd 130, the electronic computing device 110 interprets the meaning of the physical gesture to generate a verbal answer corresponding to the physical gesture. In order to interpret the meaning of the physical gesture, the electronic computing device 110 may make use of a gesture recognition database that contains a verbal answer for different types of physical gestures recognized by the video analytics engine 330. In accordance with some embodiments, the electronic computing device 110 may use one or more keywords included in a question presented to the crowd 130 to further augment the meaning of a physical gesture recognized from an individual 140 in the crowd 130. As an example, the electronic computing device 110 may detect that a gesture indicating a 'raised hand' detected from an individual 'X' may indicate that the individual 'X' answered in the affirmative (i.e., yes) to a question (e.g., "raise your hand if you are from a [particular country]") presented to the crowd 130. In this example, the electronic computing device 110 may interpret the 'raised hand' gesture to generate a verbal answer indicating that the "individual X is from a [particular country]." As a further example, in response to a question such as "how many children are you traveling with?" the electronic computing device 110 may use the keywords "how many" in conjunction with the gesture indicating a "show of three fingers" to generate a verbal answer "three children" to the presented question. In accordance with some embodiments, the electronic computing device 110 may generate a verbal answer even if the individual 140 has not made any non-verbal response in response to a presented question. For example, if the electronic computing device 110 did not detect any response from an individual 'Y' in response to a question such as "raise your hand if you are from a [particular country]" presented to the crowd 130, the electronic computing device 110 may still generate a verbal answer indicating that the "individual Y is not from a [particular country]." This is because the keywords "raise your hand" included in the question required a non-verbal action (i.e., to raise a hand) from individuals in the crowd 130 if they intended to answer in the affirmative. In this example, since the individual 140 did not provide the required non-verbal action (i.e., raising a hand), the electronic computing device 110 generated a verbal answer "no" (i.e., "individual [Y] is not from a [particular country]" even though the electronic computing device 110 did not detect any non-verbal response from the individual 'Y'. In accordance with embodiments, the electronic computing device 110 may generate a visual and/or audio output (e.g., via a display 318 and/or speaker 320 shown in FIG. 3) providing an indication of the verbal answer interpreted from the physical gesture made by different individuals 140 to respond to different questions presented to the crowd 130.

In accordance with embodiments, the electronic computing device 110 further analyzes the pattern of non-verbal responses to determine whether there is a leader-follower relationship between individuals 140 identified from the crowd 130. More particularly, the electronic computing device 110 analyzes a pattern of non-verbal responses detected from different individuals 140 in the crowd 130 to classify each individual 140 as one of: (i) a leader with a specific follower or followers; (ii) a follower of a specific leader or leaders; or (iii) a follower of the crowd 130 (i.e., not following a specific individual). The term "follower" may refer to an individual 140 who looks to another individual (who may be classified as a "leader") to answer first before providing his or her own non-verbal response that is consistent with the leader for greater than a threshold number of questions presented to the crowd 130. As an example, an individual 140 classified as a "follower" may be a member of a criminal gang who would want to wait for the leader to answer first before providing consistent answers with the leader(s) to avoid being caught. As another example, an individual 140 classified as a "follower" could also be a victim present within the crowd 130, where the victim may feel coerced or compelled to provide consistent answers with the oppressor or trafficker due to fear of retaliation. Furthermore, the term "follower of the crowd" may refer to an individual 140 who constantly or frequently looked to a number of other individuals (i.e., greater than a threshold number of other individuals, for example, six individuals in a crowd of ten) within the crowd 130 before answering a question presented to the crowd 130. An example of a process 500 for classifying the individuals 140 into one of the above categories is described with reference to FIG. 5.

Figure 6:
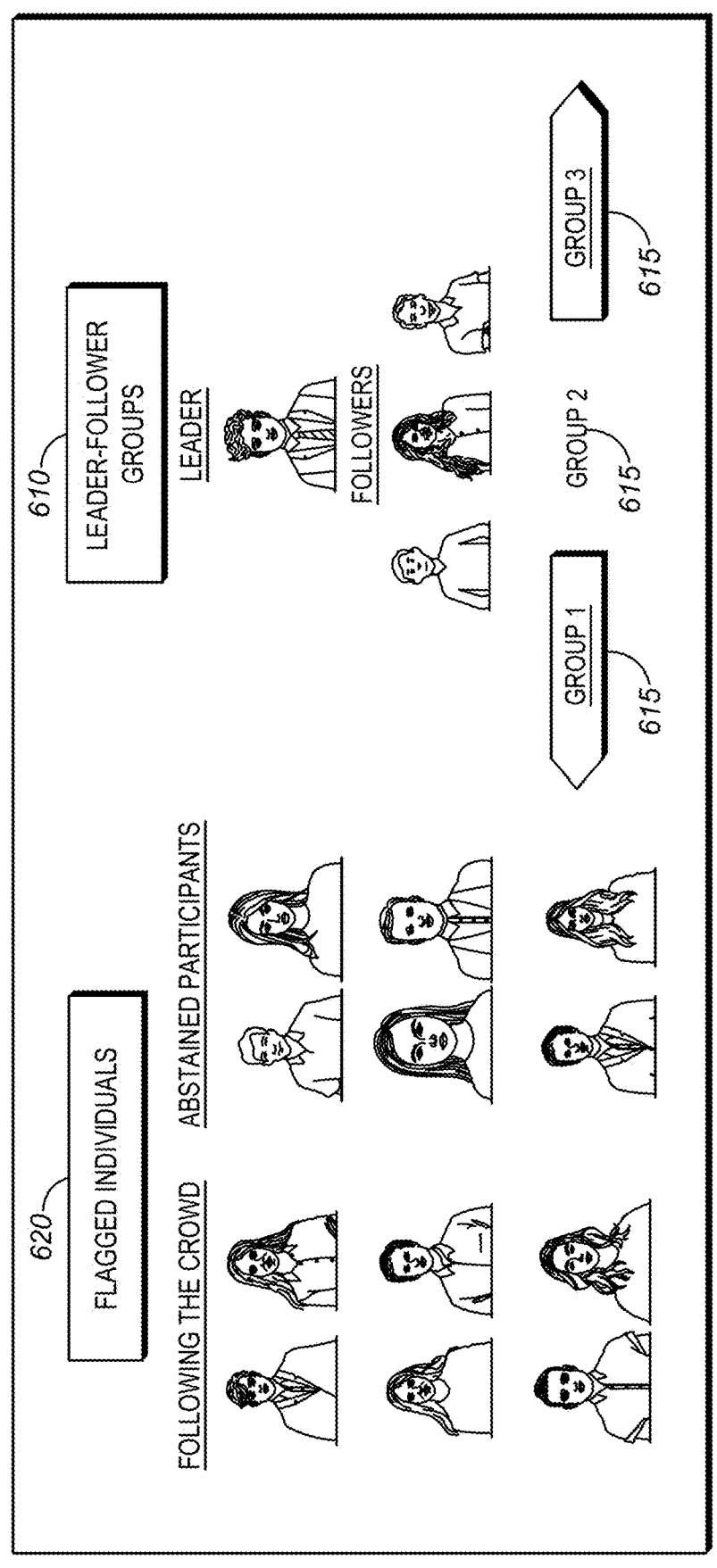
FIG. 6 illustrates a graphical user interface illustrating the hierarchy of relationships between different groups of individuals in a crowd in accordance with some embodiments.

Next, at block 440, the electronic computing device 110 generates a visual and/or audio output identifying the leader-follower relationship between the individuals 140 from the crowd 130. For example, the electronic computing device 110 may generate a visual output indicating the leader-follower relationship via a display 318 shown in FIG. 3. An example graphical user interface displaying the leader-follower relationship is shown in FIG. 6. Additionally or alternatively, the electronic computing device 110 may generate an audio output indicating the leader-follower relationship via a speaker 320 shown in FIG. 3.

Now referring to FIG. 5, a flowchart diagram illustrates a process 500 for classifying individuals 140 in a crowd 130. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 3, and embodied as a singular computing device or distributed computing device may execute process 500 via an electronic processor 313.

The electronic computing device 110 may execute the process 500 at power-on, at some predetermined periodic time period thereafter, in response to a trigger raised locally at the electronic computing device 110 via an internal process or via an input interface or in response to a trigger from an external device (e.g., a computing device associated with an agency initiating a group interview with the crowd 130) to which the electronic computing device 110 is communicably coupled, among other possibilities. As an example, the electronic computing device 110 is programmed to automatically trigger execution of the process 500 in response to receiving an input (e.g., from an officer associated with the agency) indicating that a group interview is completed. In one embodiment, the group interview is completed when responses for all the questions presented to the crowd 130 are captured and further stored in the static memory 316 in the form of videos or video analytics data for further processing by the electronic computing device 110.

The process 500 of FIG. 5 need not be performed in the exact sequence as shown and likewise various blocks may be performed in different order or alternatively in parallel rather than in sequence. The process 500 may be implemented on variations of the system 100 of FIG. 1 as well.

At block 510, the electronic computing device 110 analyzes video analytics data generated by the video analytics engine 330 as a result of processing and analyzing the activities of the crowd 130 captured in the videos (see block 420 of FIG. 4). The video analytics data generated by the video analytics engine 330 may show a pattern of non-verbal responses that may indicate a leader-follower relationship between individuals 140 identified from the crowd 130. In one embodiment, as shown in block 510, the electronic computing device 110 analyzes "looks to" and "looked at" video analytics data for each individual 140 in the crowd 130. The term "looks to" refers to a non-verbal response detected from an individual 140, where the non-verbal response has been recognized to mean that an individual 140 looked toward another individual in the crowd during or immediately after a particular question presented to the crowd 130. The term "looked at" refers to whether an individual 140 was looked at by another individual (e.g., when the individual 140 was providing his or her own non-verbal response to a question presented to the crowd 130) during or immediately after a particular question is presented to the crowd 130. The video analytics engine 330 may recognize a particular non-verbal response detected from an individual 140 as a "looks to" non-verbal response when an individual's non-verbal response, as captured in the videos recorded corresponding to an individual's activity in response to a presented question, includes one or more of: a change in one or more of eye gaze direction, head direction, face expression, posture, or body movement direction suggesting that the individual 140 was looking at or toward a direction of another individual assembled in the crowd 130. In response to each question presented to the crowd 130, the electronic computing device 110 stores "looks to" and/or "looked at" data for each individual 140 in the crowd 130 who either looked at another individual or was looked at by another individual in the crowd 130. At the completion of group interview, the electronic computing device 110 stores a data record identifying instances of all "looks to" and "looked at" data extracted for each individual 140 based on the non-verbal responses received from the individual 140. For each instance of "looks to" or "looked at" data, the data record also includes identity (e.g., name, number, or other data such as an image of an individual's face) of the individual 140 who looked to one or more other individuals 140 as well as information about the identity of one or more other individuals who were looked at by the individual 140. In one embodiment, the electronic computing device 110 may determine the identity of an individual 140 by recognizing unique facial features associated with the individual 140. In accordance with embodiments, the electronic computing device 110 identifies a pattern of non-verbal responses that would indicate the leader-follower relationship between individuals 140 in the crowd 130 based on the analysis of the instances of "looks to" and "looked at" data stored corresponding to each individual 140.

At block 520, the electronic computing device 110 analyzes all the instances of "looks to" data stored corresponding to an individual 140 to determine whether the individual 140 looked to one or more other individuals from the crowd 130 before responding to greater than a threshold number of questions presented to the crowd 130. The threshold number of questions may be set automatically or based on user input received from an agency initiating the group interview. As an example, the threshold number of questions is set to be 50% of the total questions presented to the crowd 130 during the group interview. In this example, suppose if the crowd 130 was presented with '15' questions during a group interview, then the electronic computing device 110 determines whether the individual 140 looked to one or more other individuals from the crowd 130 for greater than 50% (i.e., '8' questions) of the '15' questions.

If the electronic computing device 110 determines, at block 520, that the individual 140 did not look to other individuals from the crowd 130 before responding to greater than the threshold number of questions (e.g., individual 140 looked to other individuals while responding to only '1' of the '15' presented questions), then the electronic computing device 110 further proceeds to block 530 to analyze all the instances of "looked at" data stored corresponding to the individual 140 to determine whether the individual 140 was looked at by greater than a threshold number of other individuals from the crowd 130 before responding to greater than the threshold number of the questions presented to the crowd 130. The threshold number of other individuals may be similarly set automatically or based on user input received from the agency initiating the group interview. As an example, the threshold number of other individuals is set to be 60% of the total number of individuals 140 present in the crowd 130 during a group interview. In this example, suppose if the number of individuals 140 present in the crowd 130 during the group interview is '50', then the electronic computing device 110 determines whether the individual 140 was looked at by more than '30' other individuals from the crowd 130. If, at blocks 520 and 530, the electronic computing device 110 determines that (i) that the individual 140 did not look to other individuals from the crowd 130 before responding to greater than the threshold number of questions presented to the crowd 130 and (ii) the individual 140 was looked at by greater than the threshold number of other individuals in the crowd 130 before responding to greater than the threshold number of questions presented to the crowd 130, then the electronic computing device 110 classifies the individual 140 as a leader with specific followers in the leader-follower relationship as shown at block 540. As used herein, the term "leader" refers to an individual whose responses or actions were likely followed or copied by other individuals in the crowd 130 during a group interview. The electronic computing device 110 may further store information in the static memory 316 identifying the individual 140 who has been classified as a leader in a leader-follower relationship identified between individuals 140 in the crowd 130.

Returning to block 520, if the electronic computing device 110 determines that the individual 140 looked to one or more other individuals from the crowd 130 before responding to greater than the threshold number of questions presented to the crowd 130, then the electronic computing device 110 further proceeds to block 560 to analyze all the instances of "looks to" data stored corresponding to the individual 140 to determine whether the individual 140 looked to greater than a threshold number of other individuals from the crowd 130 before responding to the questions presented to the crowd 130. If, at blocks 520 and 560, the electronic computing device 110 determines that (i) the individual 140 looked to one or more other individuals from the crowd 130 before responding to greater than the threshold number of questions and (ii) the individual 140 looked to not greater than the threshold number of other individuals before responding to the questions presented to the crowd 130, then the electronic computing device 110 classifies the individual 140 as a follower of a specific leader or leaders as shown at block 550. As used herein, the term "follower" refers to an individual 140 whose responses or actions likely follow or copy another individual (i.e., an individual classified as a leader) in the crowd 130 during a group interview. The electronic computing device 110 stores information in the static memory 316 identifying the individual 140 who has been classified as a follower in a leader-follower relationship identified between individuals in the crowd 130. The electronic computing device 110 also stores information in the static memory 316 identifying a specific leader or individual who is followed by the individual 140 classified as a follower. In this case, the specific leader or leader(s) may include individuals who have been classified as such at block 540.

Alternatively, if at blocks 520 and 560, the electronic computing device 110 determines that (i) the individual 140 from the crowd 130 looked to at least one other individual from the crowd before responding to greater than the threshold number of the questions presented to the crowd and (ii) the individual 140 looked to greater than the threshold number of other individuals from the crowd before responding to the questions presented to the crowd 130, then the electronic computing device 110 classifies the individual as a follower of the crowd 130 at block 570. In this case, the individual 140 is not a follower of a specific leader or a leader of specific followers, but the individual 140 is following the crowd 130.

In accordance with embodiments, the electronic computing device 110 repeats the process 500 described herein for each individual 140 present in the crowd 130. Accordingly, the electronic computing device 110 analyzes the "look to" and "looked at" data stored corresponding to each individual 140 to classify each individual as one of (i) a leader with specific follower(s), (ii) a follower of specific leader(s), or (iii) a follower of the crowd 130. It is also possible for an individual 140 to be classified both as a leader with specific follower(s) and a follower with specific leader(s). In one embodiment, if the electronic computing device 110 does not detect any response from an individual 140 for greater than the threshold number of questions, the electronic computing device 110 may classify the individual 140 as an abstainee.

In accordance with embodiments, after classifying each of the individuals 140 present in the crowd 130 into one of the above categories, the electronic computing device 110 proceeds to block 580 to generate follow-up questions to be presented to or follow-up actions to be performed with respect to one or more of the individuals 140 in the crowd 130 as a function of the leader-follower relationships identified between the individuals 140 and verbal answers generated corresponding to the non-verbal responses or physical gestures made by the individuals 140. The follow-up questions and actions generated by the electronic computing device 110 may be provided as a visual and/or audio output via the display 318 and/or speaker 320 shown in FIG. 3.

Now referring to FIG. 6, a graphical user interface 600 is shown. The graphical user interface 600 may be rendered on a display 318 of the electronic computing device 110 shown in FIG. 3. In accordance with embodiments, the graphical user interface 600 may display a hierarchy of leader-follower relationships 610 identified between different groups of individuals 140 in the crowd 130. In accordance with some embodiments, the electronic computing device 110 may identify multiple groups 615 of individuals 140 identified from the crowd 130, where each group has a leader and one or more followers. A user (e.g., an officer associated with an agency which initiated the group interviewing process) can select a group 615 to view the identity (e.g., name, number, or other identification data such as person's face) of individuals included in the leader-follower relationship. In accordance with some embodiments, it is possible for a leader identified in one group to be classified as a follower of a different leader in another group.

As further shown in FIG. 6, the graphical user interface 600 may also display a list of flagged individuals 620 via the display 318. Furthermore, the electronic computing device 110 may generate and/or display a set of recommended questions to be asked to flagged individuals and/or a set of follow-up actions to be performed with respect to a flagged individual. As an example, the flagged individuals 620 may include a list of individuals 140 who are classified as an 'abstainee' i.e., individuals who did not respond to greater than a threshold number (e.g., 50% of questions) of questions presented to the crowd 130. The electronic computing device 110 may generate additional questions to be presented (e.g., during a private interview) to a flagged individual or a recommended follow-up action (e.g., conduct a private interview) to be performed with respect to a flagged individual to obtain more information about the flagged individual's involvement in the activities of the crowd 130. For example, questions or follow-up actions (not shown) presented on the graphical user interface 600 may be structured to determine if there is a language barrier or other impediment or impairment that prevented the flagged individual from responding to questions presented during the group interview. Similar questions may be generated for individuals who are classified as following the crowd 130.

Flagged individuals may also include individuals 140 who are classified as leaders with specific followers. In this case, the electronic computing device 110 may generate and display some additional follow-up questions to be asked (e.g., privately instead of during the group interview) to the leader. Following are examples of questions that may be generated by the electronic computing device 110 to be presented to an individual 140 classified as a leader: "can you point us to the people in this group that you lead?," "in what capacity are you leading the group?," or "how much time have you been in a leadership role?." Flagged individuals may also include individuals 140 who are classified as followers with a specific leader or leaders. In this case, the electronic computing device 110 may generate and display some additional follow-up questions to be asked (e.g., privately instead of during the group interview) to the followers. Following are examples of questions that may be generated by the electronic computing device 110 to be presented to individuals classified as followers: "please point us to your group leader?"; "who else is part of your group or you work with?"; and "what is your role in the group?" Similar questions may be generated for individuals 140 who are classified as both a leader and a follower.

In accordance with some embodiments, the electronic computing device 110 automatically processes the answers provided by the flagged individuals, for example, in response to questions presented to them during a private interview session. The answers provided by the flagged individuals may be in any form including speech, written, or non-verbal form. The electronic computing device 110 may employ the natural language processing engine to automatically parse the answers provided by the flagged individuals. In addition, based on the answers provided by the flagged individuals, the electronic computing device 110 may modify the relationships between individuals 140 in the crowd 130 as previously determined from a pattern of non-verbal responses captured during the group interview. As an example, an individual 140 classified as an 'abstainee' or as someone who did not respond to greater than a threshold number of questions presented to the crowd 130 during the group interview may choose to provide answers to follow-up questions presented during a private interview about his or her specific involvement or role in an activity involved by the crowd 130. Based on the information obtained from the individual 140 during the subsequent interview, the electronic computing device 110 may reclassify this individual 140 as a leader or as a follower and further update the leader-follower relationship previously identified between the individuals 140 in the crowd 130.

Furthermore, while embodiments of the present disclosure are described with examples relating to identifying relationships between individuals in a crowd during a group interview initiated by a public-safety agency, embodiments of the present disclosure can be also readily adapted for non-public safety environments including press, media, utilities, retail, healthcare, manufacturing, oil/gas, electric, private security, and other business environments where there may be a need to automatically identify relationships between groups of individuals who have assembled or gathered together at a location.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B"

should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of identifying relationships between individuals in a crowd, the method comprising:

detecting, at an electronic computing device, questions presented to a crowd with an instruction directing the crowd to answer each question in the form of non-verbal responses rather than in the form of verbal responses;

enabling, at the electronic computing device, at least one camera to record videos capturing activities of the crowd in response to each presented question;

analyzing, at the electronic computing device, the activities of the crowd captured in the videos using a video analytics engine to identify a pattern of non-verbal responses that would indicate a leader-follower relationship between individuals identified from the crowd;

determining that the pattern of non-verbal responses would indicate the leader-follower relationship when analysis of the activities of the crowd indicate that (i) at least one individual from the crowd looked to at least one other individual from the crowd before responding to greater than a threshold number of the questions presented to the crowd, and (ii) the at least one individual looked to not greater than a threshold number of other individuals from the crowd before responding to the questions presented to the crowd;

classifying the at least one individual as a follower in the leader-follower relationship; and generating, at the electronic computing device, a visual and/or audio output identifying the leader-follower relationship between the individuals identified from the crowd, wherein the visual and/or audio output further indicates that the at least one individual is classified as the follower in the leader-follower relationship.

2. A method of identifying relationships between individuals in a crowd, the method comprising:

detecting, at an electronic computing device, questions presented to a crowd with an instruction directing the crowd to answer each question in the form of non-verbal responses rather than in the form of verbal responses;

enabling, at the electronic computing device, at least one camera to record videos capturing activities of the crowd in response to each presented question;

analyzing, at the electronic computing device, the activities of the crowd captured in the videos using a video analytics engine to identify a pattern of non-verbal responses that would indicate a leader-follower relationship between individuals identified from the crowd;

determining that the pattern of non-verbal responses would indicate the leader-follower relationship when analysis of the activities of the crowd indicate that (i) at least one individual from the crowd was looked at by greater than a threshold number of other individuals in the crowd before responding to greater than a threshold number of the questions presented to the crowd, and (ii) the at least one individual did not look to other individuals from the crowd before responding to greater than the threshold number of the questions presented to the crowd;

classifying the at least one individual as a leader in the leader-follower relationship; and generating, at the electronic computing device, a visual and/or audio output identifying the leader-follower relationship between the individuals identified from the crowd, wherein the visual and/or audio output further indicates that the at least one individual is classified as the leader in the leader-follower relationship.

3. The method of claim 1, further comprising:

analyzing the activities of the crowd captured in the videos using the video analytics engine to identify a second pattern of non-verbal responses indicating that (i) at least one second individual from the crowd looked to at least one other individual from the crowd before responding to greater than the threshold number of the questions presented to the crowd, and (ii) the at least one second individual looked to greater than the threshold number of other individuals from the crowd before responding to the questions presented to the crowd; and classifying the at least one second individual as a follower of the crowd, wherein the visual and/or audio output further indicates that the at least one second individual is classified as the follower of the crowd.

4. The method of claim 1, further comprising:

categorizing one or more of the non-verbal responses captured in response to each question presented to the crowd as a physical gesture made by a respective one of the individuals from the crowd to answer to a respective one of the questions presented to the crowd.

5. The method of claim 4, further comprising:

for each of the one or more of the non-verbal responses categorized as the physical gesture, interpreting the meaning of the physical gesture to generate a verbal answer corresponding to the physical gesture.

6. The method of claim 5, wherein the visual and/or audio output further provides an indication of the verbal answer interpreted from the physical gesture made by a respective one of the individuals to respond to a respective one of the questions presented to the crowd.

7. The method of claim 6, further comprising:

generating a follow-up question to be presented to a respective one of the individuals or a follow-up action to be performed with respect to the respective one of the individuals as a function of the verbal answer generated corresponding to the physical gesture and the respective one of the individual's role either as a leader or a follower in the leader-follower relationship.

8. The method of claim 1, further comprising:

analyzing the activities of the crowd captured in the videos using the video analytics engine to identify a pattern of lack of responses from at least one individual from the crowd for greater than the threshold number of questions presented to the crowd; and generating a follow-up question to be presented privately to the at least one individual or a follow-up action to be performed with respect to the at least one individual, wherein the visual and/or audio output further indicates a follow-up question or the follow-up action.

9. The method of claim 1, wherein prior to enabling the at least one camera, the method further comprising:

providing, via the visual and/or audio output, an instruction to arrange the at least one camera to have a field of view covering each individual from the crowd.

10. The method of claim 1, wherein the visual and/or audio output further includes an identity for each of the individuals identified from the crowd and an indication of whether each of the individuals identified from the crowd is classified as one or more of a leader, a follower, or a follower of the crowd.

11. An electronic computing device, comprising:

a communications interface; and an electronic processor communicatively coupled to the communications interface, the electronic processor configured to:

detect questions presented to a crowd with an instruction directing the crowd to answer each question in the form of non-verbal responses rather than in the form of verbal responses;

enable, via the communications interface, at least one camera to record videos capturing activities of the crowd in response to each presented question;

receive, via the communications interface, the recorded videos capturing activities of the crowd;

analyze the activities of the crowd captured in the videos using a video analytics engine to identify a pattern of non-verbal responses that would indicate a leader-follower relationship between individuals identified from the crowd;

determine that the pattern of non-verbal responses would indicate the leader-follower relationship when analysis of the activities of the crowd indicate that (i) at least one individual from the crowd looked to at least one other individual from the crowd before responding to greater than a threshold number of the questions presented to the crowd, and (ii) the at least one individual looked to not greater than a threshold number of other individuals from the crowd before responding to the questions presented to the crowd;

classify the at least one individual as a follower in the leader-follower relationship; and generate a visual and/or audio output via a corresponding visual and/or audio output identifying the leader-follower relationship between the individuals identified from the crowd, wherein the visual and/or audio output further indicates that the at least one individual is classified as the follower in the leader-follower relationship.

12. An electronic computing device, comprising:

a communications interface; and an electronic processor communicatively coupled to the communications interface, the electronic processor configured to:

detect questions presented to a crowd with an instruction directing the crowd to answer each question in the form of non-verbal responses rather than in the form of verbal responses;

enable, via the communications interface, at least one camera to record videos capturing activities of the crowd in response to each presented question;

receive, via the communications interface, the recorded videos capturing activities of the crowd;

analyze the activities of the crowd captured in the videos using a video analytics engine to identify a pattern of non-verbal responses that would indicate a leader-follower relationship between individuals identified from the crowd;

determine that the pattern of non-verbal responses would indicate the leader-follower relationship when analysis of the activities of the crowd indicate that (i) at least one individual from the crowd was looked at by greater than a threshold number of other individuals in the crowd before responding to greater than a threshold number of the questions presented to the crowd, and (ii) the at least one individual did not look to other individuals from the crowd before responding to greater than the threshold number of the questions presented to the crowd;

classify the at least one individual as a leader in the leader-follower relationship; and generate a visual and/or audio output via a corresponding visual and/or audio output identifying the leader-follower relationship between the individuals identified from the crowd, wherein the visual and/or audio output further indicates that the at least one individual is classified as the leader in the leader-follower relationship.

13. The electronic computing device of claim 11, wherein the electronic processor is configured to:

analyze the activities of the crowd captured in the videos using the video analytics engine to identify a second pattern of non-verbal responses indicating that (i) at least one second individual from the crowd looked to at least one other individual from the crowd before responding to greater than the threshold number of the questions presented to the crowd, and (ii) the at least one second individual looked to greater than the threshold number of other individuals from the crowd before responding to the questions presented to the crowd; and classify the at least one second individual as a follower of the crowd, wherein the visual and/or audio output further indicates that the at least one second individual is classified as the follower of the crowd.

14. The electronic computing device of claim 11, wherein the electronic processor is configured to:

categorize one or more of the non-verbal responses captured in response to each question presented to the crowd as a physical gesture made by a respective one of the individuals from the crowd to answer to a respective one of the questions presented to the crowd.

15. The electronic computing device of claim 14, wherein the electronic processor is configured to:

for each of the one or more of the non-verbal responses categorized as the physical gesture, interpret the meaning of the physical gesture to generate a verbal answer corresponding to the physical gesture.

16. The electronic computing device of claim 15, wherein the visual and/or audio output further provides an indication of the verbal answer interpreted from the physical gesture made by the respective one of the individuals to respond to the respective one of the questions presented to the crowd.

17. The electronic computing device of claim 15, wherein the electronic processor is configured to:

generate a follow-up question to be presented to a respective one of the individuals or a follow-up action to be performed with respect to the respective one of the individuals as a function of the verbal answer generated corresponding to the physical gesture and the respective one of the individual's classification either as a leader or a follower in the leader-follower relationship.

18. The electronic computing device of claim 11, wherein the electronic processor is configured to:

analyze the activities of the crowd captured in the videos using the video analytics engine to identify a pattern of lack of responses from at least one individual from the crowd for greater than the threshold number of questions presented to the crowd; and generate a follow-up question to be presented privately to the at least one individual or a follow-up action to be performed with respect to the at least one individual, wherein the visual and/or audio output further indicates a follow-up question or the follow-up action.

* * * * *